United States Patent [19]

Morin et al.

[11] Patent Number: 5,796,071
[45] Date of Patent: Aug. 18, 1998

[54] PANE FOR AUTOMOBILE VEHICLE

[75] Inventors: Claude Morin, Puteaux; Andre Beyrle, Tracy-le-Val, both of France

[73] Assignee: Saint-Gobain Vitrage, Courbevoie, France

[21] Appl. No.: 604,608

[22] Filed: Feb. 21, 1996

[30] Foreign Application Priority Data

Feb. 21, 1995 [FR] France .................. 95 01964

[51] Int. Cl.[6] .................. B60L 1/02; E06B 3/24; B44L 5/08

[52] U.S. Cl. .................. 219/203; 428/38; 428/34

[58] Field of Search .................. 219/203, 522, 219/543; 428/34, 209, 210, 38, 426, 432, 434

[56] References Cited

U.S. PATENT DOCUMENTS

| | | | |
|---|---|---|---|
| 4,443,691 | 4/1984 | Sauer | 219/203 |
| 4,459,470 | 7/1984 | Shlichta et al. | 219/203 |
| 4,786,784 | 11/1988 | Nikodem et al. | 219/203 |
| 4,820,902 | 4/1989 | Gillery | 219/203 |
| 4,952,783 | 8/1990 | Aufderheide et al. | 219/528 |
| 4,971,848 | 11/1990 | Ruelle et al. | 428/38 |
| 5,099,104 | 3/1992 | Holzer et al. | 219/203 |
| 5,128,513 | 7/1992 | Byars et al. | 219/203 |
| 5,162,145 | 11/1992 | Schaefer | 428/34 |

FOREIGN PATENT DOCUMENTS

| | | |
|---|---|---|
| 0 193 464 | 9/1986 | European Pat. Off. . |
| 0 396 449 | 11/1990 | European Pat. Off. . |
| 0 574 625 | 12/1993 | European Pat. Off. . |
| 37 08 577 | 9/1988 | Germany . |
| 2 091 528 | 7/1982 | United Kingdom . |

OTHER PUBLICATIONS

"Patent Abstracts of Japan", vol. 016, No. 219 (C-0943), 22 May 1992 & JP-A-04 042835 (Michio Arai) 13 Feb. 1992 (Abstract).

Primary Examiner—John A. Jeffery
Assistant Examiner—Sam Paik
Attorney, Agent, or Firm—Oblon, Spivak, McClelland, Maier & Neustadt, P.C.

[57] ABSTRACT

This invention concerns a pane, particularly a pane for an automobile vehicle, especially a rear window or side window, comprising a glass sheet coated on its inner face, i.e., the face intended to be towards the passenger compartment, with a network based upon an enamel composition of low emissivity and/or conductive of electricity, this network extending over, essentially, the entire area of the glass sheet corresponding to the viewing field, with a rate of coverage by the enamel composition of between 20 and 90%, and preferably between 25 and 80% of the area over which the network extends.

17 Claims, 2 Drawing Sheets

PANE FOR AUTOMOBILE VEHICLE

BACKGROUND OF THE INVENTION

1. Field of the Invention

This invention concerns a novel pane, particularly a novel pane for an automobile vehicle, suitable for use either as a rear window or side window, providing not only increased comfort for the occupants of the vehicle, but also greater safety and, in addition, a new appearance.

2. Description of the Prior Art

The new models of automobile vehicles have a continuing tendency to increase the glazed areas thereof. This increase in area presents a number of problems.

One of the problems that arise is the increased heating of the passenger compartment of the vehicle, due to the greenhouse effect in the case of strong sunlight. Another problem is the removal of mist and/or frost from these surfaces.

For reducing the greenhouse effect, it has already been proposed, for example, to use as an automobile pane, a pane comprising at least one sheet of tinted glass having an antisolar functionality.

The term antisolar functionality is to be understood here as meaning a ratio between the light transmission factor $TL_A$ and the global energy transmission factor TE, such that the ratio $TL_A/TE$ is greater than 1. The tinted glass proposed may be a glass, the formulae for which are described, for instance, in Patent Publication EP-A-O 353 140.

This glass contains iron oxides of 0.55 to 0.95% by weight of total $Fe_2O_3$ and of 0.11 to 0.22% by weight of FeO, giving a ratio $FeO/Fe_2O_3$ total of 0.19 to 0.35.

It has a light transmission factor $TL_A$ greater than 70% and a ratio $TL_A/TE$ greater than 1.3.

Another tinted glass composition having an antisolar functionality comprises, in percentages by weight, from 0.75 to 1.4% total iron expressed in the form of $Fe_2O_3$, from 0.25 to 0.32% of ferrous iron in the form of FeO. This glass has, for a thickness of between approximately 3 and 3.3 millimeters, a light transmission factor $TL_A$ at least equal to 70%, and a global energy transmission factor TE less than approximately 46%.

The tinted glass may also be a glass having a lower light transmission $TL_A$, the formulae of which are described, for example, in document EP-A-O 536 046. This glass contains, as coloring agents, from 0.45 to 2.5% of $Fe_2O_3$ expressed as total iron, from 0.001 to 0.02% of CoO, from 0 to 0.0025% of Se and from 0 to 0.1% of $Cr_2O_3$. This glass has, for a thickness of 3.85 mm, a light transmission factor $TL_A$ lying between 20 and 60% and a global energy transmission factor TE lying between 10 and 48%, the ratio $TL_A/TE$ being greater than 1.

The proposals described above, although they may be satisfactory in terms of reducing the energy transmission factor, nevertheless can require glass composition formulae that are substantially more expensive or may be more difficult to process (more difficult melting), than a conventional silico-soda-calcic glass.

For resolving the problem of the removal of mist and/or frost from an automobile pane, it has already been proposed to equip the pane with a heating network. This heating network, like that described, for example, in Patent Publication FR-A-1 464 585, is made up of narrow resistance strips based upon an electrically conducting composition, disposed parallel to one another with a spacing of the order of 2 to 3 cm approximately, extending between two collector strips. The resistance strips and the collector strips are generally deposited directly on the glass substrate by a screen-printing process, and baked during the heat treatment preceding the bending and toughening of the pane. The electrically conducting composition is made of a pasty suspension in a binder, of a metallic silver composition and a glass frit. The resistance strips forming the network in the viewing field of the pane are relatively fine, their width being generally between 0.2 and 0.8 mm, so as not to interfere with visibility through the pane.

There is also known, from Patent Publication FR-A-2 497 731, a heating pane in which the heating network is in the form of a mesh network, the openings of the conducting meshes having a maximum dimension of 10 mm and preferably from 2 to 6 mm, and the individual lines forming the meshes having a width less than or equal to 0.5 mm and preferably less than 0.3 mm so as not to interfere with vision. The conducting meshes are deposited in such a way as to cover less than 20% of the area of the panel over which the mesh network extends. The preferred conducting material is chosen from the group consisting of aluminum, nickel and copper.

The above-described heating networks, although they enable mist and frost to be satisfactorily removed, do not provide a solution to the problem of reducing the greenhouse effect in the automobile vehicle.

The invention proposes a novel pane, particularly a novel pane for a transportation vehicle, capable of being used as a rear window or side window pane of an automobile vehicle, and which provides a solution to the various problems recalled above, by providing increased comfort for the occupants of the vehicle, improved safety, and in addition a novel appearance.

SUMMARY OF THE INVENTION

The pane according to the invention comprises a glass sheet coated on its inner face, i.e. the face intended to be towards the passenger compartment, with a network based upon an enamel composition, which is opaque or essentially opaque, of low emissivity and/or conductive of electricity, extending over essentially the entire area of the glass sheet corresponding to the viewing field, with a rate of coverage by the composition of between 20 and 90%, and preferably between 25 and 80%, of the area over which the network extends.

DESCRIPTION OF THE PREFERRED EMBODIMENTS

Figure 1:
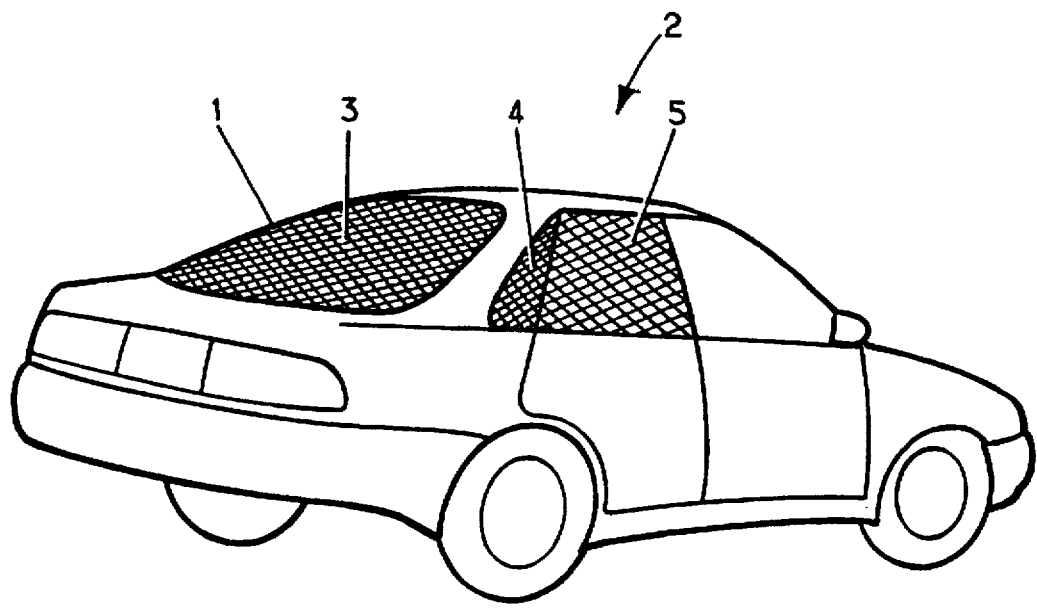
FIG. 1 shows an automobile vehicle, equipped with network panes according to this invention for the rear window and the rear side windows.

The term in "low emissivity" is to be understood to mean, according to this invention, a film or coating, the emissivity of which is less than that of a bare sheet of glass.

The term "enamel composition" is to be understood, according to this invention, as meaning a composition based upon a paste that may be deposited, preferably, by screen-printing onto the glass sheet and capable of being baked, preferably, during the thermal treatment preceding the bending-toughening of the glass sheet. This composition may contain metallic oxides and/or metals and, if applicable, a glass frit. When screen-printed on, the glass sheet may be stated to be coated with a printed network.

According to this invention, the network, which has at least one repetitive motif or design, extends over essentially the entire area of the glass sheet corresponding to the field of viewing. This means that the network may extend over at least 90% of the area of the glass sheet corresponding to the field of viewing, that is to say of the area of the glass sheet not already covered by a peripheral strip, for example. Preferably, the network extends over the entire area corresponding to the viewing field.

The term "essentially opaque" is to be understood as meaning a film of the enamel composition, for which the light transmission factor $TL_A$ is less than approximately 5% for the deposited thickness. This deposited thickness may vary, for example, from 1 to 20 µm in the baked state and advantageously from 3 to 10 µm.

According to one embodiment of the invention, the coating forming the enamelled network is based upon a composition containing at least one component giving a film of low emissivity. Such a component may be chosen from among the metallic oxides, such as the oxides of iron, chromium, cobalt, titanium, aluminum, tin, copper, ruthenium and indium, or from among the metals such as silver, gold, platinum, aluminum or from among mixtures of these metals and/or oxides, the emissivity of the component or components chosen being less than that of glass, that is to say, less than 0.837 and preferably less than 0.6. It is understood that an emissivity of 1 corresponds to the emissivity of an ideal black body.

According to another embodiment of the invention, the composition forming the enamel network contains at least one electrically conducting metal. This metal is preferably silver, with the result that the composition exhibits, simultaneously, electrically conducting and low emissivity properties.

Thus, by incorporating a metal, such as silver, into the composition intended for forming the network, it is possible to convert this network into a heating network covering essentially the entire area corresponding to the viewing field. For this purpose, two electrical supplying collector strips are associated with the conductive enamelled network, which then has a continuity of material in the motif or design to assure the passage of the electric current between the two collector strips.

The conductor network may have a very variable motif or motifs, and be formed, for example, of an assembly of mutually crossing lines or strips forming a kind of grating or trellis, or it may also be a motif comprising holes, it being understood that in all cases, the area covered by the material constituting the network amounts to between 20 and 90% of the area of the glass sheet covered by the network, and preferably from 25 to 80% thereof. In the case of a motif comprising holes, the holes may be circular, square, rectangular, of diamond shape or of any other geometric form, such as an oblong form or one of elliptical type.

The number of holes and their dimensions may be determined according to the coverage rate desired for the network. Preferably, the mean width of the spaces covered by the composition forming the motif, for example in the present case the spaces covered between adjacent holes, remains greater than 0.5 mm approximately, notably for the purpose of assuring the reliability of the heating network.

Given the importance of the coverage of the surface of the glass by the composition forming the conductor network, the latter may be formed from metals of very varying resistivities, depending upon the concentration in the composition of this metal or of these metals, and also upon the thickness of the conductor deposited on the surface of the glass, it being understood that the global resistance desired for the heating circuit is, for example, between 0.5 and 1 ohm for a heating rear window of an automobile vehicle.

The composition forming the conductor network is therefore adapted to the surface covered by the composition. This adaptation may be made by the choice of the conductor component or components and of its (or their) concentration in the composition. If it is desired to increase the electrical resistance of the composition, it is possible, for example, to introduce into this composition metals and/or metal oxides of low conductivity in the form of a paste or powder, and/or to add a glass frit in greater or lesser proportions.

According to one characteristic of the invention, a composition is chosen containing a metallic silver paste in proportions that give the desired electrical resistance, in such a way as to obtain, advantageously, a weakly emissive characteristic for the pane provided with the network. Silver pastes have resistivities which can, of course, vary according to their silver concentration. Silver pastes may be used alone, if their resistivities are suitable, or, for those that have too low resistivity values, by being mixed with at least one paste of a metal of higher resistivity, such as zinc, nickel, copper, etc. and/or by other means as described above, for example, by addition of metal oxide or oxides and/or a glass frit and/or pigments, in greater or lesser proportions.

For producing the pane according to the invention, the network based upon the enamel composition is formed by screen-printing. When the network is intended to form a heating network, it may be deposited at the same time as the two collector strips, if the latter comprise at least one layer of this same enamel composition. After the network has been deposited on the pane, the latter is subjected to the thermal treatment which precedes bending and toughening.

During the course of this heat treatment, the baking of the composition forming the network takes place.

When the network is constructed from a composition having a mean resistivity that is higher than that commonly used for a known heating network comprising fine strips based upon a silver paste, it may be advantageous to deposit a second layer of a composition having a weaker resistivity over the collector strips, notably for the purpose of reducing the heating at the level of the collector strips and/or for improving the soldering of the terminals for the electrical supply.

In a variant, the collector strips may be the subject of a separate deposition from an appropriate conductive paste.

When the pane has an enamelled peripheral strip, which is generally the case, notably, when the pane is mounted by gluing in the opening of the bodywork, the deposition of the network covering the viewing field of the pane according to this invention is carried out after the deposition of this peripheral strip. The baking of the deposits then takes place simultaneously, during the bending-toughening heat treatment.

According to one embodiment of the invention, the heating network according to this invention may be modulated in order to favor certain heating zones. In other words, the network may be constructed to produce more or less amounts of heat on some area of the pane. For example, it can be useful to have more heating in the central area of a rear window to reduce the time for defogging. This modulation may be produced by varying the percentage of the area covered by the material forming the network, which is then a variable network, in relation to the total area of the pane, and/or by varying the thickness of the network according to position.

The network according to the invention may be formed from a motif having a regular and continuous repetition over the entire area of the pane. In a variant, it may have a motif with a repetition that varies according to the desired zones. The network may also be a multiple network, that is to say formed of several networks separated from one another by bands of bare glass, that is to say bands not covered by the motif, these bands of bare glass being, however, narrow. In particular, when the network is a heating network, it may be formed of two or more parts (or networks) separated from one another by bands of bare glass that extend between the collector strips.

For improving the antisolar character of the pane and hence the comfort, the glass substrate is advantageously formed from a tinted glass, for which the ratio $TL_A/TE$ is greater than 1, like those described earlier.

The pane according to the invention may be used with advantage as a heating rear window and/or as a lateral pane, especially a rear lateral pane for the automobile. Apart from the comfort due to a low solar factor and good ratio $TL_A/TE$, it may also provide a concealing or "privacy" effect.

It is understood that the solar factor is the sum of the TE factor and of the energy absorbed by the pane and re-emitted towards the interior of the vehicle.

The pane according to the invention may have a monolithic structure, by being formed only of a single glass sheet substrate, coated with the printed network. The substrate may also have a laminated structure, comprising several layers or sheets of glass and/or of plastics material. Thus the glass sheet coated with the printed network may be associated with, i.e., attached to, another glass sheet, by means of an intermediate film, for example, of polyvinyl butyral. It may also be associated with one or more layers of plastic material to form an asymmetric glass/plastic pane. Thus, for example, the printed glass sheet may be coated with one or more layers or sheets having one or more of the properties, including surface properties such as resistance to scratching and abrasion, antilaceration properties, energy-absorber properties etc. Suitable asymmetric panes may use, for example, films of polyurethane, such as those described, in Patent Publications FR-A-2 480 669, FR-A-2 546 810, FR-A-2 398 606, EP-A-0 132 198, EP-A-0 389 354, EP-A-0 190 517, or again JP-A-86 177 241 and JP-A-86 281 118, from which the person skilled in the art will be able to obtain the necessary teaching.

In this asymmetric structure, the pane according to this invention has the layer or layers of plastics material on the face of the glass sheet coated by the printed network.

The printed glass sheet may also be associated with another sheet of glass, from which it is separated by a suitable spacer, to form a double glazing pane.

Other advantages and characteristics of the invention will be apparent from the remainder of the description, with reference to the figures of the drawings.

The pane 1 according to the invention, as shown in FIG. 1, being mounted on an automobile vehicle 2, may be used as a heating rear window pane 3 or as a rear lateral pane (fixed window 4 or rear door window 5). It is provided with a network of the enamel, covering the field of viewing, deposited on the inner face of the glass sheet and having antisolar properties and/or electrical conducting properties. The pane has a light transmission factor $TL_A$ that may vary according to the application of the pane, whether as a rear window or as a lateral pane, the $TL_A$ being then generally lower for the rear window than for the lateral pane.

Figure 2:
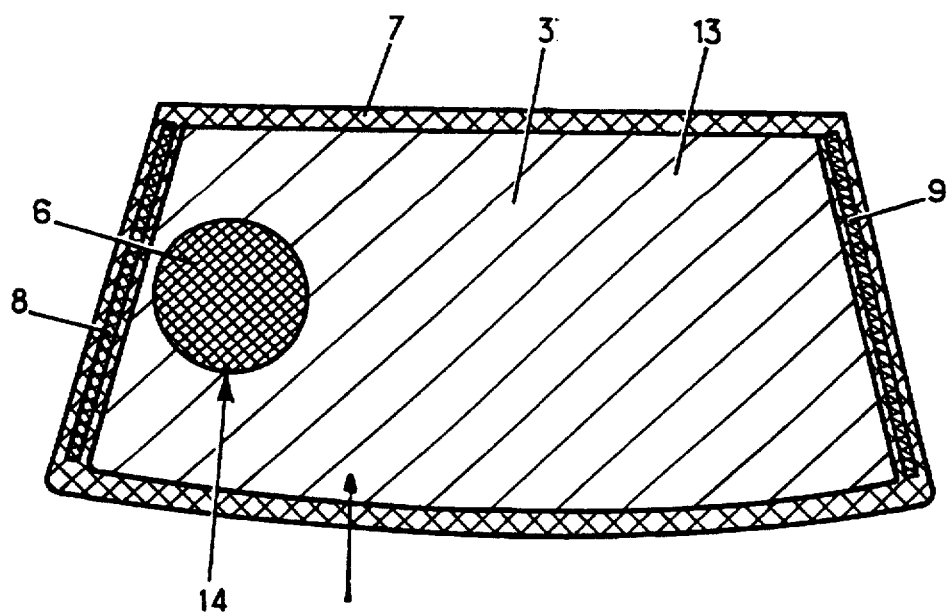
FIG. 2 shows a rear window according to this invention.

In its application as a heating rear window, as shown in FIG. 2, the pane 3 according to the invention may be provided with a network of the enamel 6, based upon an electrically conducting composition, extending over essentially the entire area of the field of view 13 of the rear window formed by a glass sheet 15, that is to say, as far as the enamelled peripheral strip 7 and up to the two collector strips 8, 9. Only one portion 14 of the motif is shown.

Having generally described this invention, a further understanding can be obtained by reference to certain specific examples which are provided herein for purposes of illustration only and are not intended to be limiting unless otherwise specified.

EXAMPLE 1

The network uses a repetitive, continuous motif comprising holes, the rate of coverage by the material forming the motif being approximately 68%.

Figure 3:
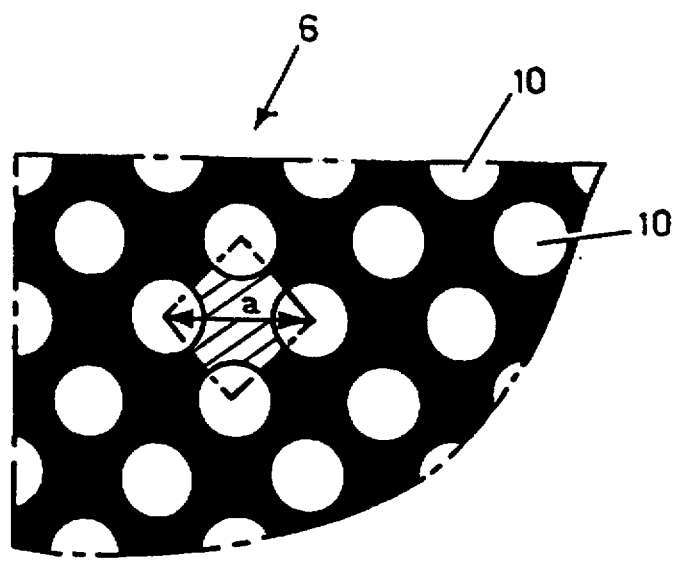
FIG. 3 shows a detail of the network printed onto the rear window of FIG. 2.

FIG. 3 shows in greater detail this motif covering the pane of FIG. 2.

The motif 6 is a repetitive motif comprising holes. These holes 10, of diameter approximately 0.9 mm, are disposed along parallel lines, the centers of four adjacent holes being placed at the four apexes of a square, the diagonals of which measure approximately 2 mm. By this motif a rate of coverage is obtained calculated as 68% of the area over which the network extends.

For manufacturing the heating rear pane, the following procedure is used.

After cutting out and shaping of the glass, there is deposited, onto the face of the glass sheet intended to be towards the passenger compartment, a black enamel paste adapted for forming the peripheral strip. The $TL_A$ factor of the glass sheet, which has a thickness of approximately 4 mm, is approximately 71% and the TE factor is approximately 44%.

The black enamel paste has anti-adhesive properties ("antistick" properties) with respect to the shaping equipment for the glass sheet, and an opacity to silver. This enamel paste is formed from a frit of glass based upon lead borosilicate, pigments and metallic iron.

The deposition of this black enamel paste is performed by printing by means of a silk-screen.

After this first deposit has been dried, there is deposited, again by screen-printing, a conducting paste of the enamel intended for forming the electrically conducting network, extending over the entire area of the glass sheet as far as the peripheral strip, the network resting over said peripheral strip.

The enamel conducting paste used comprises a mixture of a silver paste containing 55% by weight silver and a zinc paste containing 67.5% by weight zinc. Eighty-three parts of silver paste are used for 17 parts of zinc paste. The conducting paste contains, in addition, 12 parts of a glass frit based upon lead borosilicate. The resistivity of the conducting paste is approximately 100 μΩ·cm (resistivity measured after baking), the objective being the obtaining of a heating network of approximately 200 watts power for a voltage of approximately 13 volts.

After deposition of the conductor network, a third deposition is carried out by screen-printing of a paste containing 75% by weight silver, intended for forming the two collector strips which come into contact with the enamelled conductor network. The more conducting paste enables the resistance of the collector strips to be reduced and allows soldering of the terminals (not shown) for the electrical supply.

The pane coated with the heating network is then subjected to a heat treatment for drying and a baking heat treatment which corresponds to the treatment preceding bending and toughening of the pane.

After baking, the conductor network has a thickness of approximately 5 μm.

The heating rear window finally produced has a $TL_A$ factor of 19% and a TE factor of 11%.

The solar factor of the pane is 29%. This value may be compared with that obtained for a similar pane using a like motif but based upon a known black enamel composition of the peripheral strip. In this case the solar factor is 32.5%. The pane according to the invention exhibits a reduction of more than 10% in the solar factor. In terms of comfort, this reduction is very significant.

In terms of heating, the network was completely satisfactory, being at least as efficient as a network made up of narrow resistance strips.

EXAMPLE 2

Figure 4:
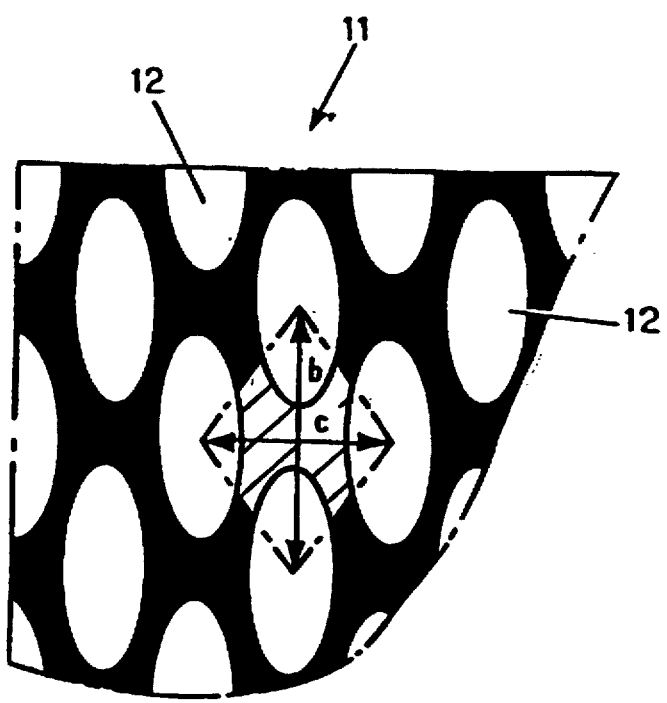
FIG. 4 shows a variant of a printed network for a rear window according to this invention.

FIG. 4 shows a variant of a printed network for a rear window according to this invention.

The network 11 uses, in this case, a repetition motif comprising holes 12 of elliptical form. The major axis of the ellipse, which measures approximately 2.8 mm, is disposed in the direction of the height of the rear window, and the minor axis measures 1.1 mm approximately.

The centers of four adjacent holes are placed at the apexes of a diamond, the diagonal b of which measures 3.5 mm along the height and the diagonal c 2.5 mm along the width.

By this motif, a coverage rate is obtained calculated at 33.5% of the area over which the network extends.

For producing the rear window which uses this motif, the procedure is the same as that described above, except that for forming the network a conducting paste is used, which is a mixture in a proportion of 84 parts of silver paste comprising 55% by weight silver and 16 parts of zinc paste comprising 75% by weight zinc. There are added approximately 10 parts of a frit of glass based upon lead borosilicate. The resistivity of the conducting paste is approximately 52μΩ·cm.

The objective is, here again, to obtain a heating network of approximately 200 watts power for a supply at approximately 13 volts.

The rear window finally obtained has a $TL_A$ factor of 45% approximately and a TE factor of approximately 28%.

In terms of heating, the network proves to be efficient.

EXAMPLES 3 AND 4

In two other examples, Examples 3 and 4, of panes according to the invention, there are used conducting pastes compositions A and B, respectively, comprising the following components, in quantities expressed in parts by weight:

|  | A | B |
| --- | --- | --- |
| silver | 15 | 20 |
| ruthenium oxide (RuO$_2$) | 4 | 2 |
| pigment (CuCr$_2$O$_4$) | 3 | 26 |
| PbO-based frit | 78 | 52 |

The resistivities of the pastes are, respectively, 70μΩ·cm and 140μΩ·cm.

When the pane according to the invention is used as a rear lateral, non-heating pane, it may be produced by the method described above without, of course, the deposition of the collector strips by screen-printing.

In its application as a rear window pane, the pane according to the invention, in addition to the advantages indicated above, limits dazzle due, notably, to the headlights of vehicles at night.

The disclosure of French patent application 95 01 964, filed Feb. 21, 1995, is hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pane comprising a glass sheet coated on one face thereof with a network comprising an opaque or essentially opaque enamel composition, of low emissivity, or conductive of electricity, or both, said network extending over essentially the entire area of the glass sheet, with a rate of coverage by the enamel composition lying between 20 and 90%, of the area over which the network extends.

2. The pane according to claim 1, wherein the enamel composition contains at least one component producing a layer of emissivity lower than the emissivity of glass, selected from the group consisting of metallic oxides, metals and mixtures thereof.

3. The pane according to claim 2, wherein the emissivity of the layer is less than 0.6.

4. The pane according to claim 3, wherein the composition comprises at least one metal that is a conductor of electricity.

5. The pane according to claim 4, wherein the composition contains silver.

6. The pane according to claim 1, wherein the composition comprises at least one silver paste or at least one mixture of a silver paste and a paste of another metal that is a weaker conductor of electricity.

7. The pane according to claim 1, wherein the composition additionally contains a glass frit.

8. The pane according to claim 1, wherein the composition additionally contains at least one pigment.

9. The pane according to claim 1, wherein the network has a continuous repetitive motif.

10. The pane according to claim 4, wherein the network is a heating network containing two collector strips.

11. The pane according to claim 4, wherein the width of the spaces covered by the composition is greater than 0.5 mm on average.

12. The pane according to claim 10, wherein the network is modulated such that one or more areas of the network produce more or less heat than remaining areas.

13. The pane according to claim 1, wherein the pane has a light transmission factor to global energy transmission factor ratio greater than 1.

14. The pane according to claim 1, wherein the glass sheet is a tinted glass having an antisolar functionality.

15. The pane according to claim 1, wherein the glass sheet is attached to at least one other sheet of glass or of plastics material.

16. The pane according to claim 1, wherein the rate of coverage is 25 to 80%.

17. The pane according to claim 1, wherein the pane is a rear window or lateral pane of an automobile vehicle having a passenger compartment, and wherein the network is coated on the face of the glass sheet that faces toward the passenger compartment.

* * * * *